United States Patent [19]

McCann et al.

[11] Patent Number: 5,518,306

[45] Date of Patent: May 21, 1996

[54] ANTI-LOCK HYDRAULIC BRAKING SYSTEMS FOR VEHICLES

[75] Inventors: Denis J. McCann, Powys, Wales; Andrew J. Ward, Birmingham; Michael Jones, Warwickshire, both of England

[73] Assignee: Lucas Industries Public Limited Company, Solihull, England

[21] Appl. No.: 13,296

[22] Filed: Feb. 4, 1993

[30] Foreign Application Priority Data

Feb. 6, 1992 [GB] United Kingdom ............. 9202534

[51] Int. Cl.⁶ ................................................ B60T 13/68
[52] U.S. Cl. ............................ 303/119.1; 303/116.1
[58] Field of Search ............................ 303/113.1, 113.2, 303/116.1, 116.2, 119.1, 115.4, 90, 115.2; 137/596.17

[56] References Cited

U.S. PATENT DOCUMENTS 5,096,269  7/1990  Pickenhahn ...................... 303/115.4

FOREIGN PATENT DOCUMENTS

| 0196753 | 10/1986 | European Pat. Off. . |
| 0437752 | 7/1991 | European Pat. Off. . |
| 2126391 | 11/1972 | Germany ............. 303/119.1 |
| 2145433 | 3/1973 | Germany ............. 303/119.1 |
| 1318161 | 5/1973 | United Kingdom . |
| 1378203 | 12/1974 | United Kingdom . |
| 1402690 | 8/1975 | United Kingdom ..... 303/119.1 |

*Primary Examiner*—Douglas C. Butler
*Assistant Examiner*—Peter M. Poon
*Attorney, Agent, or Firm*—Oldham & Oldham Co.

[57] ABSTRACT

An anti-lock (ABS) hydraulic braking system for vehicles comprises a first normally open solenoid-controlled valve (4) disposed in a line between a master cylinder (3) and a brake (1), a second normally closed solenoid-controlled valve (8) disposed between the brake and expander chamber (7), and a normally-open solenoid-controlled by-pass valve (5) located between the master cylinder and the brake and by-passing the first solenoid-controlled valve (4). The by-pass valve (5) is movable between a normally open position to provide unrestricted communication between the master cylinder and the brake, and a closed position in response to an anti-lock signal accompanied by closure of the first solenoid-controlled valve (4) and opening of the second solenoid-controlled valve (8), the by-pass valve remaining closed in a given brake application cycle with the brake being re-applied at a rate determined by flow through the first solenoid-controlled valve (4) following closure of the second solenoid-controlled valve (8).

22 Claims, 4 Drawing Sheets

ANTI-LOCK HYDRAULIC BRAKING SYSTEMS FOR VEHICLES

This invention relates to an electronic braking system and in particular, but not exclusively to an anti-lock (ABS) hydraulic braking system for a vehicle of the kind in which the supply of fluid from a fluid source to a brake on a wheel of a vehicle is modulated in accordance with the behaviour of the braked wheel by solenoid-controlled valve means responsive to signals from an electronic controller, a sensor sensing the behaviour of the braked wheel and sending signals to the controller, and fluid dumped from the brake to an expander chamber to relieve the brake is pumped back to the fluid source in order to make up the volume of fluid necessary to re-apply the brake following wheel recovery. Such a braking system is hereafter referred to as being of the kind set forth.

In known systems of the kind set forth the fluid source conveniently comprises a master cylinder or accumulator. The valve means in such systems comprise a first normally open solenoid-controlled valve disposed in a line between the fluid source and the brake, and a second normally closed solenoid-controlled valve disposed between the brake and the expander chamber. In response to an anti-lock signal the first valve closes to isolate the fluid source from the brake, and the second valve opens to dump the fluid from the brake to the expander chamber.

Such known systems are entirely satisfactory for applications in which the brake capacity is relatively small and the flow through the first valve is sufficient to operate the brake for normal braking purposes.

Such a system is shown in WO 90/05657. In order to obtain a rapid increase in braking pressure in the brake cylinder during braking without ABS control and a limited increase in pressure during braking with ABS control, a first valve controlling a floating piston is arranged in the hydraulic connecting line between the master cylinder and the brake cylinder. The floating piston controls a further valve in such a way that when the pressure in the master cylinder exceeds the pressure in the brake cylinder by a predetermined value, only a restricted flow can pass through the first valve. During braking without ABS control the first valve is open, allowing a non-restricted flow from the master cylinder to the brake cylinder.

However, in larger capacity systems, it will be necessary to increase the size of the valves in order to cater for the corresponding larger volumes of operating fluid. This is undesirable in view of the additional expense involved, the increased energizing current required to operate the valves, and the reduction in response time associated with such larger valves.

According to our invention, in an electronic braking system of the kind set forth for vehicles the valve means comprises a first normally open solenoid-controlled valve disposed in a line between the fluid source and the brake, a second normally closed solenoid-controlled valve between the brake and the expander chamber, characterized in that the valve means further comprises a normally-open solenoid-controlled by-pass valve between the master cylinder and the brake and by-passing the first solenoid-controlled valve, the by-pass valve being movable between a normally open position to provide unrestricted communication between the fluid source and the brake, and a closed position in response to a signal from the controller, the by-pass valve remaining closed in a given brake application cycle with the brake being applied at a rate determined by flow through the first solenoid-controlled valve.

In an anti-lock braking system, the controller signals the by-pass valve to move into the closed position in response to a signal from the sensor sensing the behaviour of the braked wheel, accompanied by closure of the first solenoid-controlled valve and opening of the second solenoid-controlled valve and the brake is reapplied at a rate determined by the flow through the first solenoid-controlled valve following closure of the second solenoid-controlled valve.

The addition of the solenoid-controlled by-pass valve enables us to utilized commercially available solenoid-controlled valves of small capacity, in large capacity systems in order to control brake release and re-application during an ABS cycle.

Preferably the by-pass valve comprises a pressure responsive slave or relay valve controlled by a by-pass solenoid. This has the advantage that a single by-pass solenoid can be utilized to control operation of a number of similar slave valves, each disposed in a given single channel. In such an arrangement an anti-lock signal on one wheel will cause all the slave valves to close, with the pressures applied to the brakes on the remaining wheels continuing to rise at a rate determined by flow through the first solenoid-controlled valves, and with the behaviour of the said one wheel being controlled by modulation of the pressure to that wheel at a rate determined by the first and second solenoid-controlled valves for that channel as described above.

Some embodiments of our invention are illustrated in the accompanying drawings in which.

Figure 1:
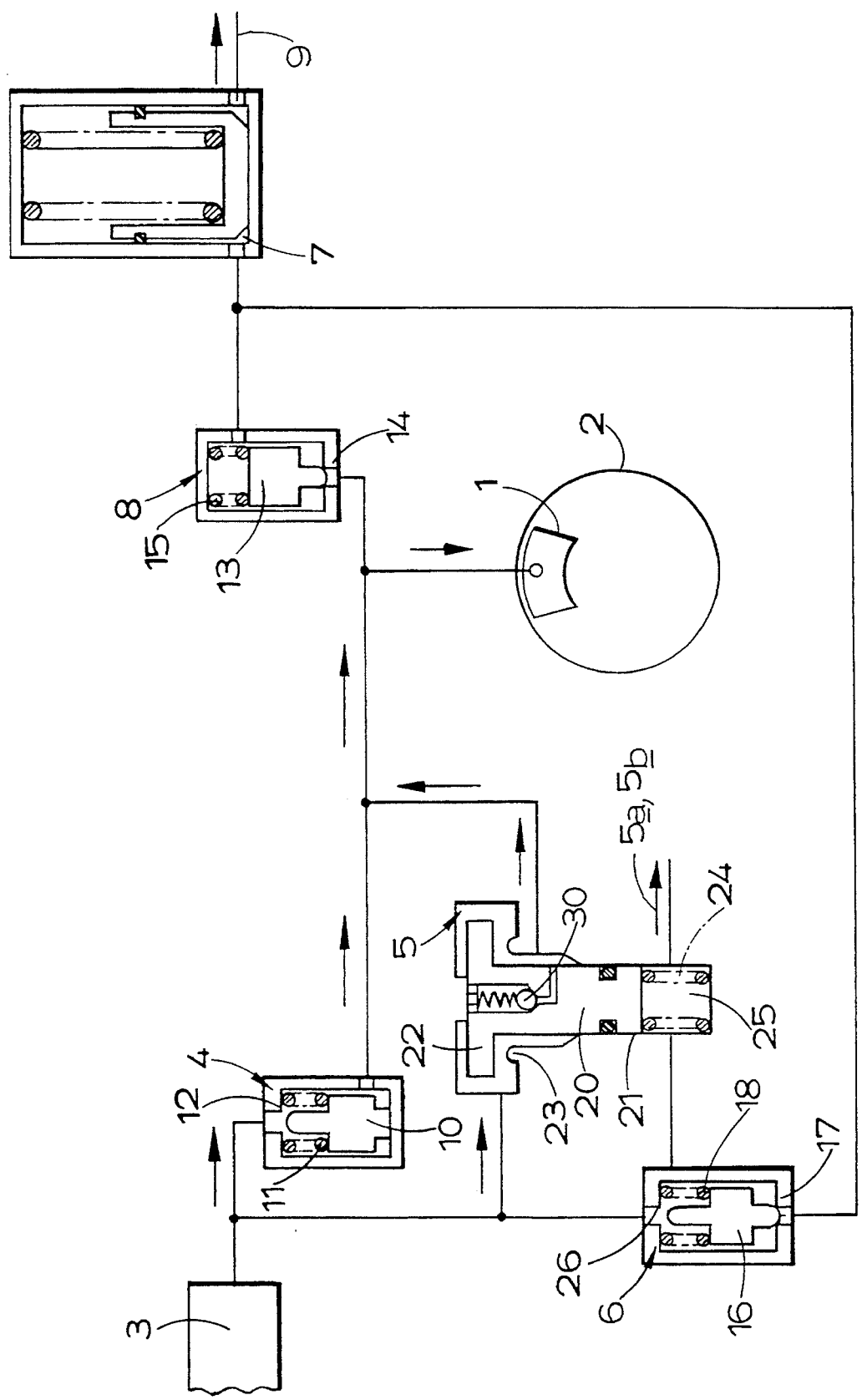
FIG. 1 is a layout of an anti-lock hydraulic braking system for a vehicle.
Figure 2:
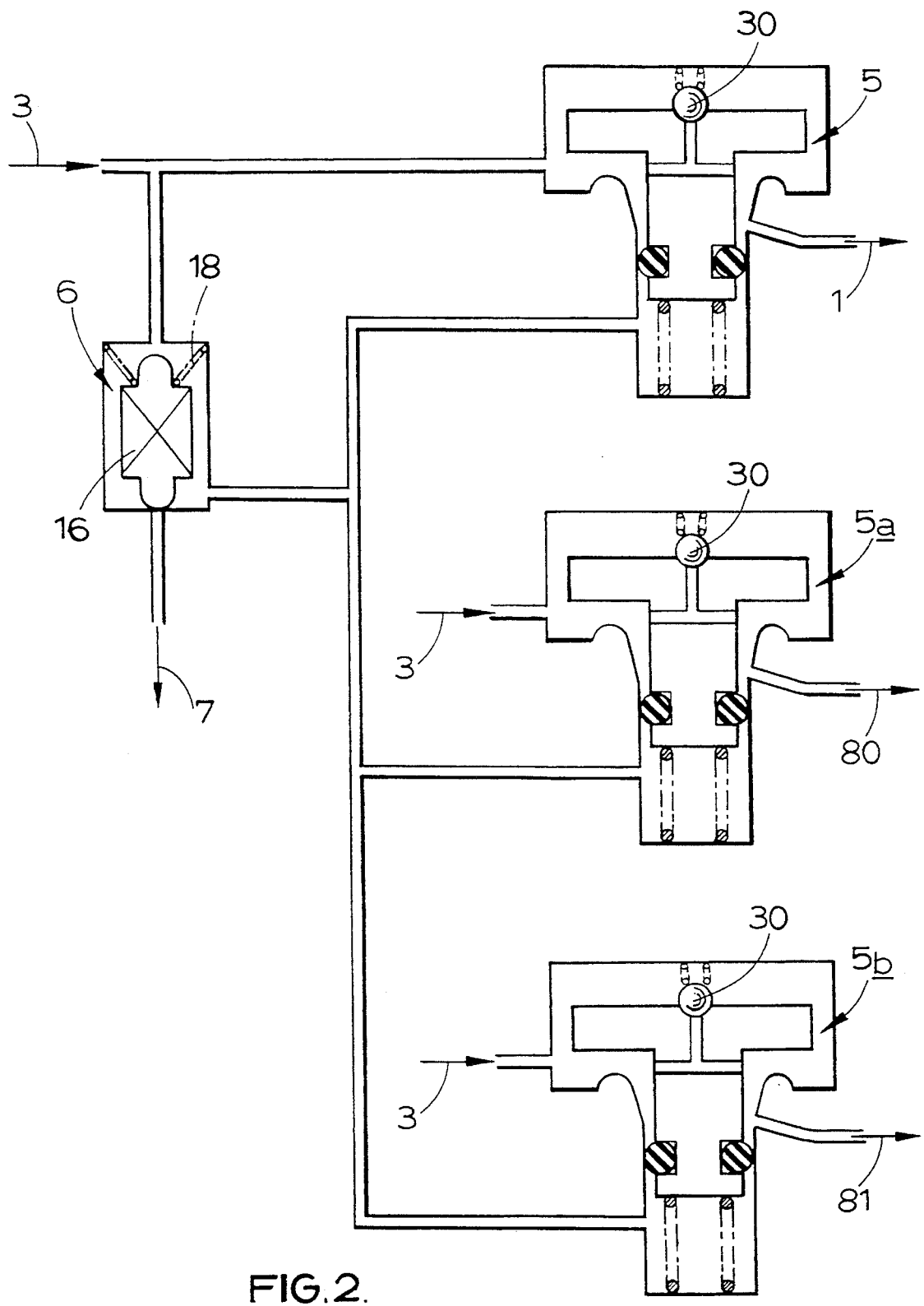
FIG. 2 shows a portion of the layout of FIG. 1 including additional pressure-responsive slave valves.

In the electronic braking system illustrated in FIGS. 1 and 2 of the accompanying drawings a brake 1 on a wheel 2 of a vehicle is adapted to be applied by a pedal-operated master cylinder 3. Fluid from the master cylinder 3 is supplied to the brake 1 through a first normally open solenoid-controlled valve 4, and through a pressure-responsive slave or relay valve 5 in parallel with and by-passing the solenoid-controlled valve 4. The operation of the slave valve 5 is controlled by a solenoid-valve 6 located in a line between the master cylinder 3 and an expander chamber 7. A second normally closed solenoid-controlled valve 8 is located in a return line between the brake 1 and the expander chamber 7.

The solenoid-controlled valve 4 comprises a valve member 10 which is normally held away from a seating 12 by means of a spring 11. Similarly the solenoid-controlled valve 8 comprises a valve member 13 which is normally urged into engagement with a seating 14 by means of a spring 15. Energization of the solenoids of the valve 4 and 8 cause the valve members to move in a direction against the loads in the springs 11,15.

The solenoid valve 6 comprises a valve member 16 which is normally urged into engagement with a seating 17 by the force in a spring 18 in order to isolate the master cylinder 3 from the expander chamber 7.

The slave valve 5 comprises a piston 20 working in a bore 21 and carrying at one end an enlarged head 22 for co-operation with an annular seating 23. A spring 24 acts on the end of the piston 20 remote from the head 22 normally to urge the head 22 away from the seating 23. In this position the master cylinder 3 is in unrestricted communication with the brake 1 through the annular seating 23. A chamber 25 containing the spring 24 is also in communication with the master cylinder 3 when the solenoid valve 6 is in the position shown in the drawings in which the valve member 16 is spaced from a seating 26 surrounding a port to which the master cylinder is connected.

A one-way valve 30 co-operates with the piston 20 to permit reverse flow of fluid through the slave valve 5 upon release of the brake 1. The valve 30 is optional and may not be required in all constructions.

As illustrated in FIG. 2 of the drawings the solenoid valve 6 controls operation of three slave valves 5,5a and 5b each disposed in a separate channel to control operation of an individual wheel brake 1,80,81. Specifically the three valves 5,5a and 5b are similar in construction and two valves 5a and 5b have been added to the single valve 5 illustrated in FIG. 1.

The system includes an electrically driven hydraulic pump 90 which is adapted to withdraw fluid from the expander chamber 7 along a line 9 and return it to the master cylinder 3.

Each wheel is provided with a speed sensor 91 from which signals are sent to an electronic control unit 92. This differentiates the signals and then emits energizing currents to control operation of the solenoid-valves 4,6 and 8 and of the electric motor for driving the pump 90, in a manner and sequence to be described.

In the normal inoperative position shown in FIGS. 1 and 2 of the drawings with the brakes "off" the three solenoid valves 4,6 and 8 are de-energized, and the electric motor driving the pump 90 is inoperative. Thus the solenoid valve 4 is open, the solenoid valve 8 is closed, and the solenoid valve 6 isolates the master cylinder 3 from the expander chamber 7, but places the master cylinder 3 in communication with the chamber 25.

When the master cylinder 3 is operated to apply the brakes the fluid from the master cylinder is supplied to each brake through its respective slave valve 5,5a and 5b. Unrestricted communication between the master cylinder 3 and the brake is therefore provided through the slave valves. A small degree of flow also takes place through the open solenoid-controlled valve 4 for each channel.

Should the signal emitted from a wheel speed sensor 91 be recognized by the electronic control unit 92 as indicative of an incipient wheel lock, the electronic control unit 92 energizes the solenoids of the valves 4, 6 and 8, and operates the electric motor to drive the pump 90. Energizing the solenoid of the valve 4 isolates the master cylinder 3 from the brake through that respective line, energization of the solenoid of the valve 6 causes the valve 16 to isolate the master cylinder from the chamber 25 and to place the chamber 25 in communication with the expander chamber 7, and energization of the solenoid of the valve 8 places the brake in communication with the expander chamber 7. Release of pressure from the chamber 25 of each slave valve 5,5a,5b causes the slave valves to close thereby cutting off the unrestricted communication between the master cylinder 3 and the brakes. The pressure applied to the brakes on the wheels not subject to an incipient wheel lock condition can still be increased at a rate determined by flow through the open solenoid-controlled valve 4 for that channel. The pump 90 withdraws fluid from the expander chamber and pumps 90 it back to the master cylinder 3.

When the incipient wheel lock condition has been corrected the two solenoid-controlled valves 4 and 8 are de-energized to enable the valve 8 to close and valve 4 to open. This enables the brake to be re-applied but at a rate determined by flow through the now open solenoid-controlled valve 4.

In the system described above the solenoid valve 6 remains in the position of isolating the master cylinder 3 from the slave valves 5,5a,5b during ABS activity.

The one way valves 30 in the slave valves 5,5a,5b permit pressure to be lowered in a brake circuit, if a driver reduces the brake effort during ABS.

Figure 3:
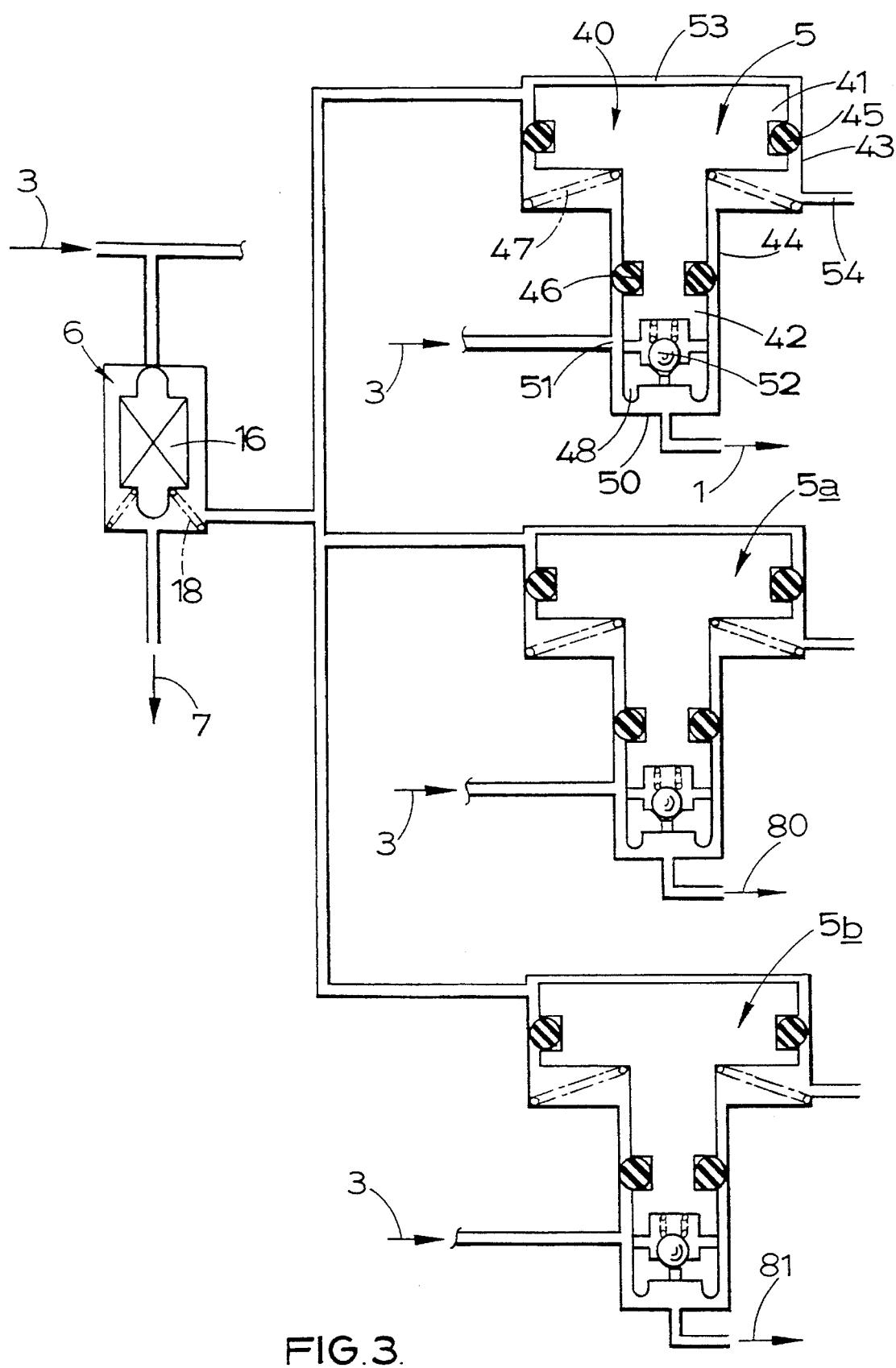
FIG. 3 is a layout similar to FIG. 2 but showing some modifications.

In the layout shown in FIG. 3 of the drawings each slave valve 5,5a,5b is of a modified construction. Since the slave valves are similar in construction only the uppermost valve 5 will be described.

As illustrated in FIG. 3 of the drawings the slave valve 5 comprises a piston 40 of differential outline having a head 41 of greater diameter and a stem 42 of smaller diameter. The head 41 and the stem 42 work in corresponding portions 43 and 44 of a bore of stepped outline. The head 41 and the stem 42 carry seals 45, 46 for sealing engagement with the walls of the respective bore portions 43 and 44. A spring 47 urges the head towards the end of the bore remote from the stem 42. The free end of the stem is provided with an annular valve head 48 for co-operation with a seating 50 surrounding an outlet to the brake 1. A connection 51 to the master cylinder is provided at an intermediate point in the bore portion 44 between the seal 46 and the seating 50. A one-way valve 52 is carried by the stem 42 to permit flow in a reverse direction between the brake and the master cylinder 3. A chamber 53 between the piston 40 and the outer end of the bore portion 43 is connected to the solenoid valve 6. A chamber defined between the piston and the bore at the steps in the changes in diameters, and in which the spring 47 is housed, is vented to atmosphere through a vent 54.

The direction of operation of the solenoid valve 6 is reversed in comparison with the system of FIGS. 1 and 2. Normally, therefore, the solenoid valve 6 is spring urged into a closed position to isolate the master cylinder 3 from the chambers 53 and place the chambers 53 in communication with the expander chamber. The slave valves 5,5a,5b are therefore held in open positions by the forces in the springs 47. This enables pressure from the master cylinder 3 to be applied directly to the brakes 1,80,81 in an unrestricted manner.

Upon energization of the solenoid valve 6 in response to an anti-lock signal, pressure from the master cylinder is admitted into the chambers 53 to provide a force imbalance. This urges the pistons 40 against the force in the springs 47 and into positions in which the heads 48 seal against the seatings 50 thereby isolating the master cylinder 3 from the brakes.

The construction and operation of FIG. 3 is otherwise the same as that of FIGS. 1 and 2 and corresponding reference numerals have been applied to corresponding parts.

Figure 4:
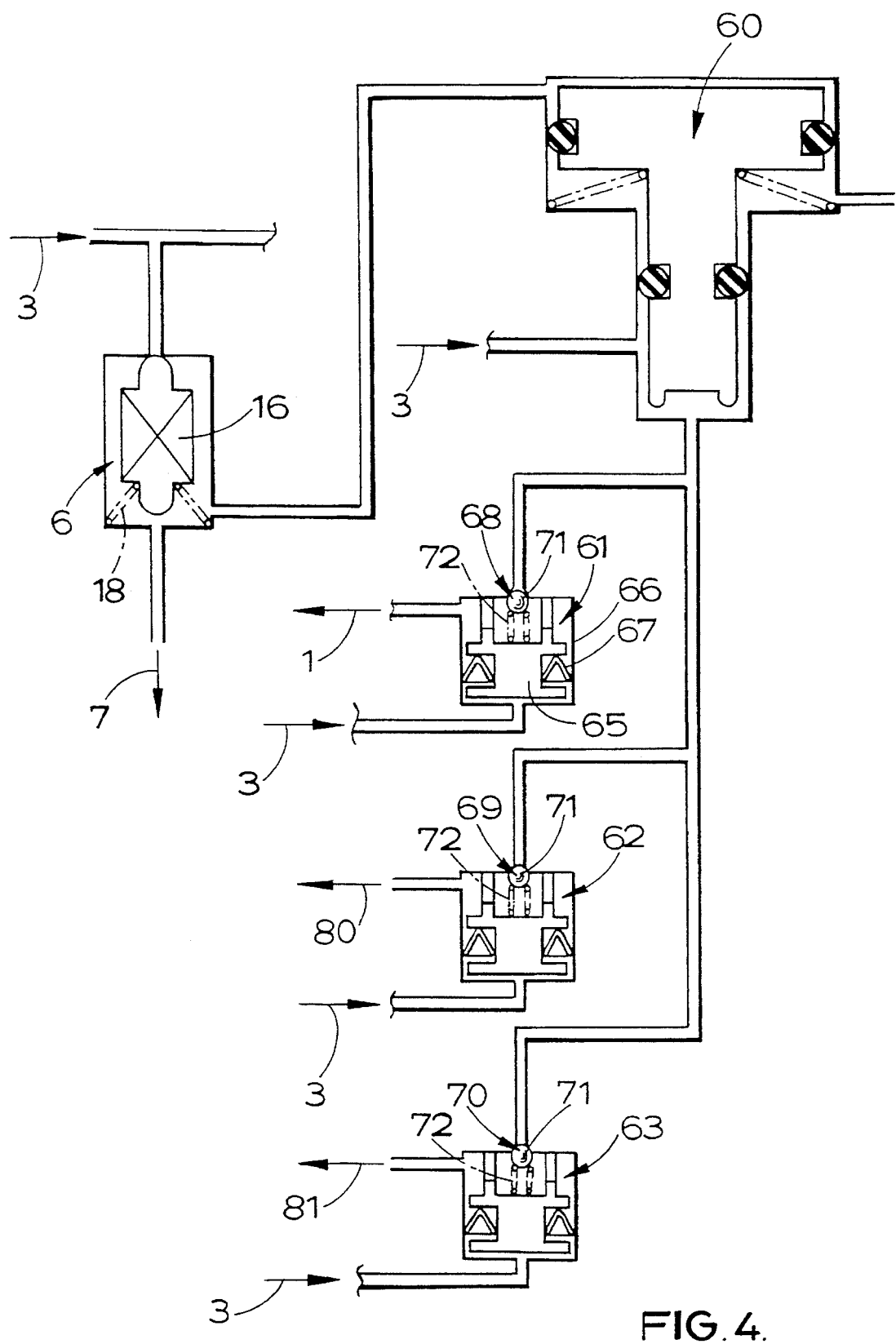
FIG. 4 is a layout similar to FIG. 2 but showing another modified layout.

In the layout illustrated in FIG. 4 of the drawings the solenoid valve 6 operates in the same direction as the solenoid valve 6 of FIG. 3 and the layout includes an upper slave valve 60 similar in construction to each of the slave valves 5,5a,5b of FIG. 3 except that the one-way valve 52 has been omitted. In this construction the single slave valve 60 provides a route around all the control channels when the valve 60 is open. When the valve 60 is closed, the by-pass route is removed. However to prevent a higher pressure in one channel passing to the other channels one-way valve packs 61, 62, and 63 are installed in each individual channel as shown.

The three one-way valve packs 61, 62 and 63 are similar in construction. One pack only will therefore be described.

As illustrated in FIG. 4 of the drawings the valve pack comprises a piston 65 working in a bore 66 and carrying a lip seal 67 for sealing engagement with the bore 66. Pressure from the slave valve 60 is admitted to each pack 61, 62, 63 through respective one-way valves 68, 69, 70. Each one-way valve comprises a valve member 71 urged against a respective seating by means of a spring 72 in abutment with one end of the piston 65 which is adjacent to the closed end of the lip seal 67. The opposite end of the piston 65 is exposed to pressure from the master cylinder 3.

During normal operation in which the solenoid valve 6 is closed to isolate the master cylinder from the slave valve 60, the slave valve is opened so that pressure from the master cylinder 3 passes through the slave valve 60 and out to the brakes through the one-way valves, 68, 69 and 70. The opposite ends of the pistons 65 are also exposed to pressure in the master cylinder 3 so that the piston 65 is held in a stationary position.

When the solenoid valve 6 is energized during an ABS cycle the slave valve 60 closes to isolate the master cylinder from all the brakes through the one way valves 68, 69 and 70.

Upon release of the master cylinder fluid from the brake returns past the lip seals.

The operation of the illustrated system has been explained in terms of an anti-lock (ABS) hydraulic braking system, however the actuation of the by-pass valve in other situations is envisaged.

One such situation is for independant traction control, also known as Anti Spin Regulation. In such an instance a single wheel may cross a low friction surface, such as a patch of snow or ice, and the wheel will begin to spin. When a spinning wheel is detected the sensor 91 detecting the behaviour of the wheel will send a signal to the controller 92, which will cause the brake to be applied. The rate at which the brake is applied may be controlled by closure of the by-pass valve. For example, the by-pass valve may be actuated once a given predetermined amount of fluid has entered the brake, so that further application of fluid is through the reduced volume of the first normally open solenoid-controlled valve.

Similarly, the situation can arise that the vehicle is travelling over a low friction surface, such as snow or ice. Such a surface can be recognized using known optical sensors. In such a case a wheel to be braked may lock causing a skid if braked too hard. The by-pass valve may be used to control the rate of normal braking in such a case.

Thus on detection of a low friction surface, the controller will actuate the by-pass valve to close the main flow path between the fluid source and the brake. Such actuation may occur after a predetermined flow of fluid into the brake. Once the main flow path has been closed, the maximum rate of further flow from the fluid source to the brake is through the first normally open solenoid-controlled valve. Thus the maximum rate of brake application is determined by the maximum flow rate through the first normally open solenoid-operated valve. This control of the brake is known as initial rise rate control.

We claim:

1. An electronic braking system for a vehicle with wheels comprising a fluid source, a brake on at least one of said wheels, a supply of fluid from said fluid source to said brake, an electronic controller for sending signals, a solenoid-operated valve means for modulating said supply of fluid in accordance with said signals from said controller, a sensor sending signals to said electronic controller indicative of a behavior of a braked wheel, an expander chamber to which the fluid is dumped from said brake to relieve said brake, a pump to pump said fluid back to said fluid source in order to make up a volume of said fluid necessary to re-apply said brake following a recovery of said wheel, said valve means comprising a first normally open solenoid-operated valve disposed in a line between said fluid source and said brake, a second normally closed solenoid-operated valve disposed between said brake and said expander chamber, and a normally-open solenoid-controlled by-pass valve between said fluid source and said brake and by-passing said first solenoid-controlled valve, said by-pass valve being movable between a normally open position to provide unrestricted communication between said fluid source and said brake, and in a closed position in response to a signal from said controller, said by-pass valve remaining in said closed position in a given brake application cycle with said brake being applied at a rate determined by a flow of said fluid through said first solenoid-controlled valve, said by-pass valve being controlled by a by-pass solenoid valve, said by-pass solenoid valve being located in a line between said fluid source and said expander chamber.

2. A system according to claim 1, in which said electronic controller signals said by-pass valve to close in response to said signals from said sensor sensing said behavior of said braked wheel, accompanied by closure of said first solenoid-controlled valve and opening of said second solenoid-controlled valve and said brake is re-applied at a rate determined by flow through said first solenoid-operated valve following closure of said second solenoid-operated valve.

3. A system according to claim 2, in which said by-pass solenoid valve is moveable between a first position to isolate said fluid source from said expander chamber and a second position to isolate the by-pass valve from said expander chamber.

4. A system according to claim 2, in which said by-pass solenoid valve is moveable from a first position to keep said by-pass valve in communication with said fluid source and a second position to isolate said by-pass valve from said fluid source.

5. A system according to claim 4, in which a one-way valve co-operates with said piston to permit a flow of said fluid through said by-pass valve to said fluid source.

6. A system according to claim 2, in which said by-pass valve comprises a piston in a bore, said piston carrying at one end an enlarged head for co-operation with an annular seating, said head normally being urged away from said seating by a biasing means to keep said fluid source in unrestricted communication with said brake, said piston defining at another end a chamber in said bore, said chamber being in connection with said fluid source when said by-pass solenoid valve is in a first position and isolated from said fluid source when the by-pass solenoid valve is in a second position.

7. A system according to claim 6, in which a one-way valve co-operates with said piston to permit a flow of said fluid through said by-pass valve to said fluid source.

8. A system according to claim 1, in which said by-pass valve comprises a piston in a bore, said piston carrying at one end an enlarged head for co-operation with an annular seating, said head normally being urged away from said seating by a biasing means to keep said fluid source in unrestricted communication with said brake, said piston defining at another end a chamber in said bore, said chamber being in connection with said fluid source when said by-pass solenoid valve is in a first position and isolated from said fluid source when the by-pass solenoid valve is in a second position.

9. An electronic braking system for a vehicle with wheels comprising a fluid source, a first brake on one of said wheels, a plurality of further brakes on said wheels, a supply of a fluid from said fluid source to said brake and said further brakes, an electronic controller for sending signals, a solenoid-operated valve means for modulating said supply of fluid in accordance with said signals from said electronic controller, a sensor sending signals to said electronic controller indicative of a behavior of a braked wheel, an expander chamber to which said fluid is dumped from said brake and said further brakes, to relieve said brake and said further brakes, a pump to pump said fluid back to said fluid source in order to make up a volume of said fluid necessary to re-apply said brake and said further brakes following a recovery of said braked wheel, said valve means comprising a first normally open solenoid-operated valve disposed in a line between said fluid source and said brake and said further brakes, a second normally closed solenoid-operated valve disposed between said brake and said further brakes and said expander chamber, and a normally-open solenoid-controlled by-pass valve between said fluid source and said brake and each of said further brakes and by-passing said first solenoid-controlled valve, said by-pass valve being moveable between a normally open position to provide unrestricted communication between said fluid source and each of said brake and said further brakes, and a closed position in response to a signal from said controller, said by-pass valve remaining in said closed position in a given brake application cycle with said brake and said further brakes being applied at a rate determined by a flow through said first solenoid-controlled valve, said by-pass valve being controlled by a by-pass solenoid valve, said by-pass solenoid valve being located in a line between said fluid source and said expander chamber.

10. A system according to claim 9, in which said electronic controller signals said by-pass valve to close in response to said signals from said sensor sensing said behavior of said braked wheel, accompanied by closure of said first solenoid-controlled valve and opening of said second solenoid-controlled valve and said brake is reapplied at a rate determined by flow through said first solenoid-operated valve following closure of said second solenoid-operated valve.

11. A system according to claim 9, in which said by-pass solenoid valve is normally moveable between a first position to keep said by-pass valve in communication with said expander chamber and a second position to isolate said by-pass valve from said expander chamber.

12. A system according to claim 11, in which said by-pass valve comprises a piston having a head and stem working in corresponding portions of a bore of stepped outline, a biasing means urging said head to said end of said bore remote from said stem, a first seal between said head and said bore and a second seal between said stem and said bore to define between said seals a first chamber vented to atmosphere and a second chamber is sealed from said first chamber by said second seal, said fluid source and said brake being connected through said second chamber.

13. A system according to claim 12, in which a one-way valve co-operates with said piston to allow flow of said fluid from said brake to said fluid source.

14. A system according to claim 9, in which said by-pass solenoid valve is moveable between a first position to isolate said fluid source from said expander chamber and a second position to isolate the by-pass valve from said expander chamber.

15. A system according to claim 14, in which said by-pass valve comprises a piston having a head and stem working in corresponding portions of a bore of stepped outline, a biasing means urging said head to said end of said bore remote from said stem, a first seal between said head and said bore and a second seal between said stem and said bore to define between said seals a first chamber vented to atmosphere and a second chamber is sealed from said first chamber by said second seal, said fluid source and said brake being connected through said second chamber.

16. A system according to claim 15, in which a one-way valve co-operates with said piston to allow flow of said fluid from said brake to said fluid source.

17. A system according to claim 9, in which each of said brake and said further brakes have a common connection to said by-pass solenoid valve.

18. An electronic braking system for a vehicle with wheels comprising a fluid source, a first brake on one of said wheels, a plurality of further brakes on said wheels, a supply of fluid from said fluid source to said brake and said further brakes, an electronic controller for sending signals, a solenoid-operated valve means for modulating said supply of fluid in accordance with said signals from said electronic controller, a sensor sending signals to said electronic controller indicative of a behavior of a braked wheel, an expander chamber to which said fluid is dumped from said first brake and said further brakes to relieve said first brake and said further brakes, a pump to pump said fluid back to said fluid source in order to make up a volume of said fluid necessary to re-apply said first brake and said further brakes following a recovery of said braked wheel, said valve means comprising a first normally open solenoid-operated valve disposed in a line between said fluid source and said first brake, a second normally closed solenoid-operated valve disposed between said first brake and said expander chamber, and a normally-open solenoid-controlled by-pass valve between said fluid source and said first brake and by-passing said first solenoid-controlled valve, said by-pass valve being movable between a normally open position to provide unrestricted communication between said fluid source and said first brake, and a closed position in response to a signal from said controller, said by-pass valve remaining in said closed position in a given brake application cycle with said first brake and said further brakes being applied at a rate determined by a flow of said fluid through said first solenoid-controlled valve, said by-pass valve being controlled by a by-pass solenoid valve, said by-pass solenoid valve being located in a line between said fluid source and said expander chamber.

19. A system according to claim 18, in which said electronic controller signals said by-pass valve to close in response to said signals from said sensor sensing said behavior of said braked wheel, accompanied by closure of said first solenoid-controlled valve and opening of said second solenoid-controlled valve and said brake is reapplied at a rate determined by flow through said first solenoid-operated valve following closure of said second solenoid-operated valve.

20. A system according to claim 18, in which said brakes have a common connection to said by-pass valve.

21. A system according to claim 20, in which a control valve is disposed between each of said further brakes and said by-pass valve.

22. A system according to claim 21, in which each said control valve comprises a piston in a bore, a seal between said piston and said bore and a one-way valve moveable between a first position to isolate each said brake from said fluid source and a second position to allow communication between each of said further brakes and said fluid source.

* * * * *